United States Patent
Shin et al.

(10) Patent No.: US 8,266,094 B2
(45) Date of Patent: Sep. 11, 2012

(54) APPARATUS AND METHOD FOR PARSING OF EXTENSIBLE MEDIA

(75) Inventors: Hyunsoon Shin, Daejeon (KR); Jaekwan Yun, Daejeon (KR); Haeryong Lee, Daejeon (KR); Kwangroh Park, Daejeon (KR); Chaekyu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 667 days.

(21) Appl. No.: 12/481,946

(22) Filed: Jun. 10, 2009

(65) Prior Publication Data

US 2009/0313206 A1    Dec. 17, 2009

(30) Foreign Application Priority Data

Jun. 13, 2008  (KR) .................. 10-2008-0055731
Jul. 8, 2008    (KR) .................. 10-2008-0065955

(51) Int. Cl.
G06F 19/00    (2011.01)
G06F 17/27    (2006.01)

(52) U.S. Cl. .......... 706/58; 715/201; 715/203; 715/205; 715/239

(58) Field of Classification Search ............ 706/46
See application file for complete search history.

(56) References Cited

U.S. PATENT DOCUMENTS

2006/0187815 A1    8/2006    Wallace et al.

FOREIGN PATENT DOCUMENTS

| EP | 1 688 850 A1 | 8/2006 |
|---|---|---|
| KR | 1020030044108 A | 6/2003 |
| KR | 1020050116916 A | 12/2005 |
| KR | 1020080016393 A | 2/2008 |
| KR | 1020080048308 A | 6/2008 |

OTHER PUBLICATIONS

Shin et al., Architecture of the SMMD Media Service System. 6th WSEAS International Conference on E-Activities, Tenerife, Spain [online], Dec. 14-16, 2007 [retrieved on Feb. 10, 2012]. Retrieved from the Internet:< URL:http://www.google.com/search?q=%28neo-data+OR+neodata+OR+neo+data%29+%22device+control%22&sourceid=ie7&rls=com.microsoft:en-us:>.*

* cited by examiner

*Primary Examiner* — Jeffrey A Gaffin
*Assistant Examiner* — Nathan Brown, Jr.
(74) *Attorney, Agent, or Firm* — Ladas & Parry LLP

(57) ABSTRACT

The present invention relates to an apparatus and a method for parsing of extensible media. In the present invention, neo-data including additional media are extracted from meta data of the extensible media by analyzing the extensible media, and a neo-data track is extracted from the extensible media and transmitted to a means for controlling the extensible media. According to the present invention, it is advantageous to maximize an extensible media service effect by providing a method for more effectively parsing extensible media having a new structure that can add device control for a realistic service and synchronization information to general media.

13 Claims, 5 Drawing Sheets

APPARATUS AND METHOD FOR PARSING OF EXTENSIBLE MEDIA

RELATED APPLICATIONS

The present application claims priority to Korean Patent Application Serial Number 10-2008-0055731, filed on Jun. 13, 2008, and Korean Patent Application Serial Number 10-2008-065955, filed on Jul. 8, 2008, the entirety of which are hereby incorporated by reference.

BACKGROUND OF THE INVENTION

1. Field of the Invention

The present invention relates to an apparatus and a method for parsing of extensible media, and more particularly, to an apparatus and a method for parsing of extensible media in a home media service system that reproduces one media by linking with several devices.

2. Description of the Related Art

In general, in a media service, media that consist of moving pictures, audio, and texts are provided through an AV device. That is, one media is reproduced in one device.

In the ubiquitous information technology (IT) age, a realistic technology satisfying human's five senses and an intelligent technology based on autonomous collaboration between devices will be aggregately applied to the media. In order to implement the technology, it is difficult to implement the technology by a scheme in which the media is reproduced in one device. That is, in order to achieve the realism, various devices and media link with each other and the device must be operated in accordance with information of the media.

In the case of the current media service, a single media single device (SMSD)-based service in which one media is reproduced in one device is principally adopted, but in order to maximize a media reproduction effect in a ubiquitous home, a single media multi devices (SMMD)-based service in which one media is reproduced by linking with a plurality of devices must be adopted. Therefore, new-concept media are required to reproduce the media through by linking the media and the plurality of devices and a method of parsing new media is considered in order to reproduce new-concept extensible media.

SUMMARY OF THE INVENTION

An object of the present invention is to provide an apparatus and a method for parsing of extensible media for more effectively providing an extensible media service having a new structure in which additional media information is added to known media.

In order to achieve the above-mentioned object, a method for parsing of extensible media according to the present invention includes analyzing extensible media and classifying the extensible media for each track in accordance with a request; determining whether or not meta data of the extensible media include neo-data having additional media and extracting the neo-data from the meta data; determining whether or not the extensible media include a neo-data track and extracting the neo-data from the neo-data track of the extensible media; and analyzing the extracted neo-data, setting a reproducing sequence of the neo-data on the basis of information extracted from the neo-data, and transmitting the neo-data to a means for controlling the extensible media.

Meanwhile, in order to achieve the above-mentioned object, an apparatus for parsing of extensible media according to the present invention includes an analyzer that analyzes the extensible media and extracts neo-data from at least one of meta data and a neo-data track of the extensible media; a neo-data analysis unit that analyzes the neo-data extracted through the analyzer and detects predetermined device control information for reproducing the neo-data; and a synchronization control unit that controls a reproducing sequence of the neo-data on the basis of the device control information provided from the neo-data analysis unit.

Further, the analyzer includes a reception module that receives extensible media downloaded from a server; a conversion module that depacketizes a packet of the extensible media acquired through the reception module and converts the extensible media into data having a predetermined format; and an analysis module that analyzes the extensible media converted through the conversion module and transmits the neo-data extracted from the extensible media to the synchronization control unit.

According to the present invention, it is possible to provide a realistic media service to a user by autonomously fusing extensible media having a new structure in which a device control for a realistic service and synchronization information can be added to known media through peripheral devices having various functions without user's physical positions such as a home, an office, a public place, etc.

Further, it is possible to maximize an effect of an extensible media service by providing a method for more effectively parsing the extensible media having the new structure in which the device control and synchronization information for the realistic service can be added to the known media.

DESCRIPTION OF THE PREFERRED EMBODIMENTS

Hereinafter, an embodiment of the present invention will be described with reference to the accompanying drawings.

Figure 1:
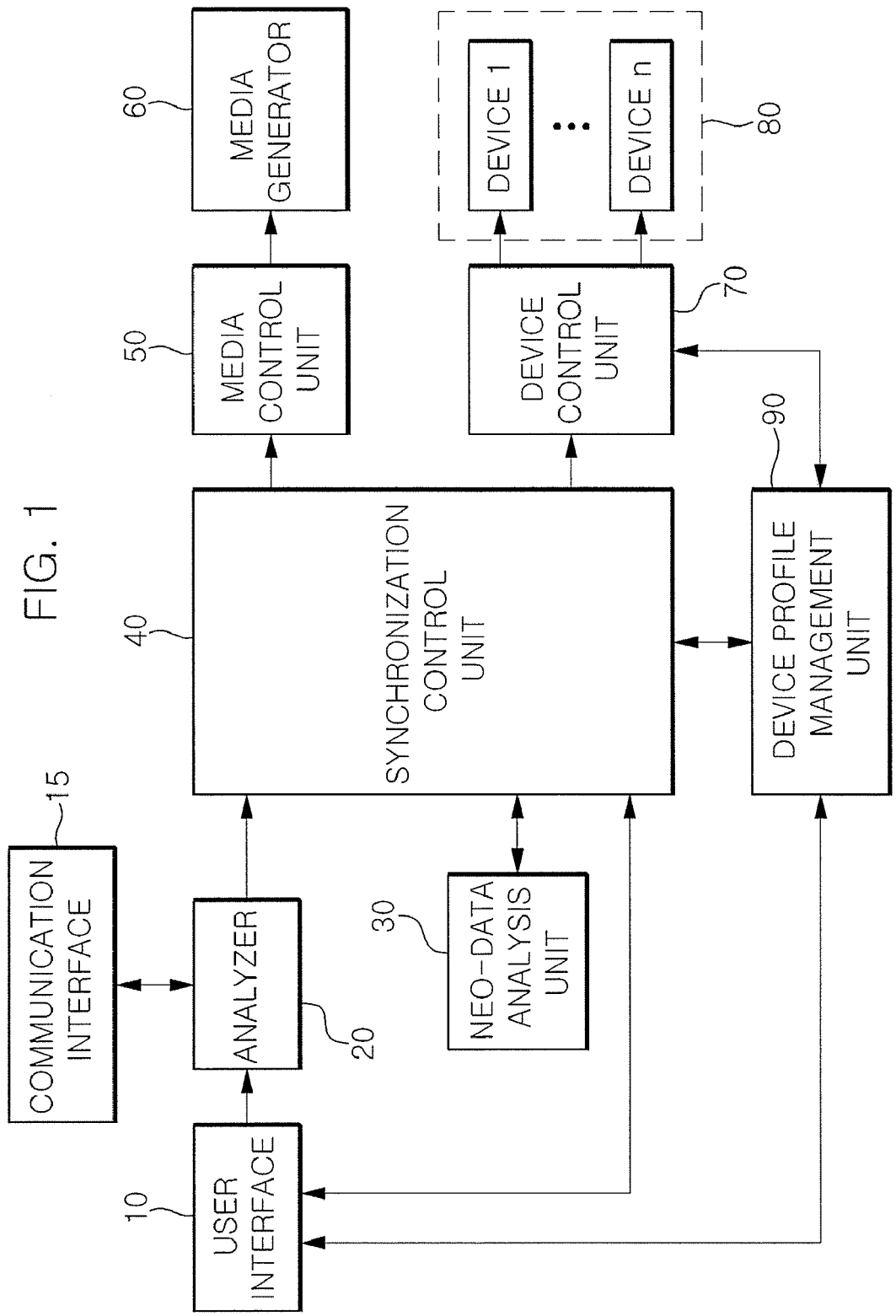
FIG. 1 is a diagram referenced for describing the configuration of an extensible media parsing apparatus according to the present invention.

FIG. 1 illustrates a home media service apparatus referenced for describing an apparatus for parsing of extensible media according to an embodiment of the present invention.

The present invention is adopted in a single media multi devices (SMMD)-based ubiquitous home media service apparatus, and more particularly, to a parsing apparatus for providing an extensible media service.

Herein, the extensible media include neo-data in which additional information such as fragrance, smell, touch, temperature/humidity, etc. are added in addition to audio, video, and text which are the known media and can provide a realistic media service by reproducing a specific effect in accordance with a personal preference and a peripheral device environment at the time of reproducing media through neo-data.

Meanwhile, the neo-data, as new-type media data, store software for reproducing the neo-data and software for device control in addition to meta data for extensible media data. Further, additional information including object-type media, experience-type media, realism-type media, etc. is recorded in the neo-data and the recorded additional information is synchronized with device information to be linked with each media.

At this time, the neo-data further include control information with respect to each device for implementing the additional information included in the neo data, synchronization information, and identification information. Herein, time, control, and parameter information are recorded in each device information.

Referring to FIG. 1, the home media service apparatus includes a user interface 10, a communication interface 15, an analyzer 20, a neo-data analysis unit 30, a synchronization control unit 40, a media control unit 50, a media player 60, a device control unit 70, a device 80, and a device profile management unit 90.

The user interface 10, as a supporting means that allows a user to interact with a system via on-line, includes a method that causes an application program or website to interact with each other and responds thereto. As one example, the user interface 10 is a web-browser.

The communication interface 15, as a means connected to a server that provides external extensible media, which receives predetermined extensible media provided through the server, allows access to the server through a web-browser, etc. which is the user interface 10. At this time, the communication interface 15 receives an extensible media packet from the server through a streaming type.

The analyzer 20 converts the extensible media packet received through the communication interface 15 into data having a predetermined format and analyzes the converted data to separate the converted data into 'media' that consist of audio, video, text, etc. and 'neo-data' that provide a specific effect added in addition to the media. At this time, the analyzer 20 analyzes the extensible media data for each object and extracts information on the media and the neo-data.

The neo-data analysis unit 30 analyzes the neo-data in accordance with a request from the synchronization control unit 40. At this time, the neo-data analysis unit 30 detects device control information, synchronization information, identification information, etc. from the neo-data and provides the information to the synchronization control unit 40.

The synchronization control unit 40 applies the media provided through the analyzer 20, that is, audio, video, text data to the media control unit 50. At this time, the media control unit 50 allows the media applied from the synchronization control unit 40 to be played through the media player 60. Herein, the media player 60 includes media playing apparatuses such as a TV, an MP3 player, a DVD player, a video player, etc.

Further, the synchronization control unit 40 detects information provided through the analyzer 20 and the neo-data analysis unit 30, that is, the device control information, the synchronization information, and the identification information and controls synchronization with respect to at least one device 80 connected based on the information detected at that time. At this time, the synchronization control unit 40 determines the device 80 for reproducing the neo-data and outputs a synchronization signal from the device control unit 70 in accordance with the determined device 80.

The device control unit 70 determines a reproducing sequence of the neo-data on the basis of the synchronization signal outputted from the synchronization control unit 40. At this time, the device control unit 70 allows the neo-data to be reproduced through the corresponding device 80 in accordance with the determined reproducing sequence. That is, the device control unit 70 allows the corresponding neo-data by driving the corresponding device to be reproduced among the devices 80 connected in accordance with the synchronization signal issued from the synchronization control unit 40.

Herein, the synchronization signal is issued based on the media playing sequence and time. At least one device 80 reproduces the neo-data while the media is played through the media player 60.

The device 80 is an output means that is connected to reproduce additional media such as the realism-type media, the experience-type media, the object-type media, etc. in addition to the media player 60. At this time, as the device 80, the device 80 positioned in the vicinity thereof is adopted at the time of playing the extensible media. Of course, another media playing apparatus may also be adopted in the device 80 in addition to the media player 60 that is used at present. As one example, home appliances such as a TV, an audio, an air-conditioner, etc., and portable devices such as a mobile phone, a smart phone, a PDA, etc. may be used, however, the present invention is not limited thereto.

The device profile management unit 90 is a means that manages a profile for at least one device 80 connected to the device control unit 70. The device profile management unit 90 provides the profile for at least one device 80 connected to the device control unit 70 in accordance with a request from the synchronization control unit 40.

Figure 2:
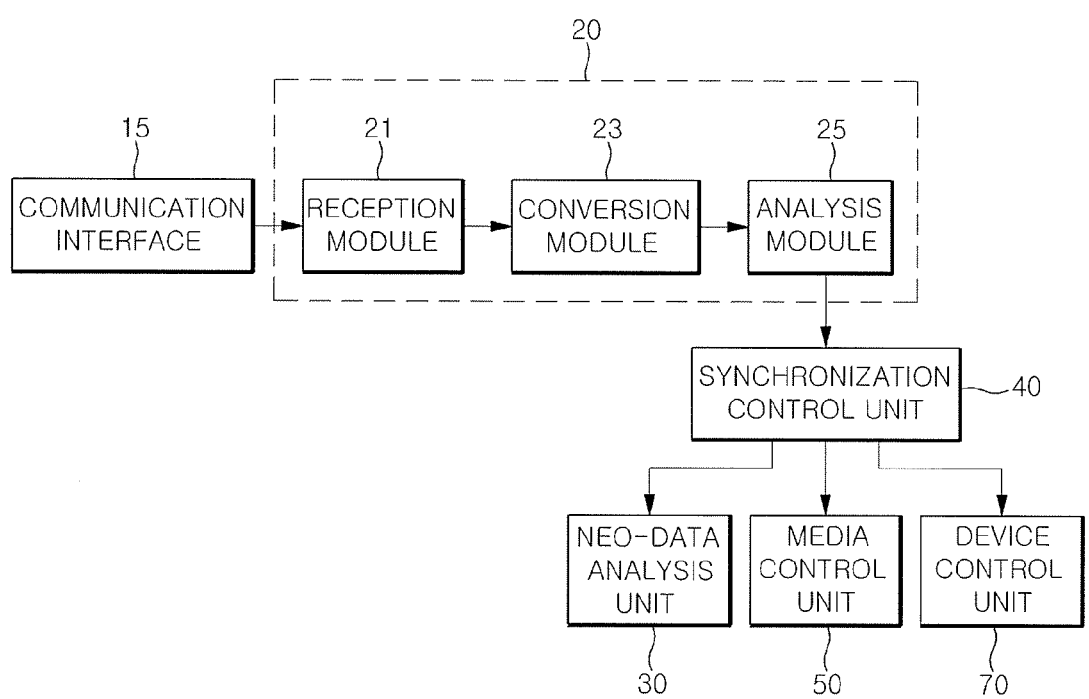
FIG. 2 is a diagram referenced for describing the configuration of an analyzer according to the present invention.

FIG. 2 is a block diagram illustrating the configuration of an extensible media parsing apparatus according to the present invention and illustrates the detailed configuration of the analyzer 20 of FIG. 1.

The analyzer 20 according to an embodiment of the present invention includes a reception module 21, a conversion module 23, and an analysis module 25 as shown in FIG. 2.

First, the reception module 21 receives the extensible media received through the communication interface 15. In the case when the extensible media acquired through the reception module 21 is packet-type streaming data, the conversion module 23 depacketizes the extensible media packet and converts the extensible media packet into data having a predetermined format.

The analysis module 25 analyzes the extensible media data converted through the conversion module 23 and classifies the extensible media data for each object, and classifies the classified objects for each track. Of course, the analysis module 25 can also analyze the extensible media data that are previously possessed.

Further, the analysis module 25 decodes the meta data of the extensible media data and verifies whether or not the meta data include the neo-data. At this time, when it is detected that the meta data includes the neo-data, the analysis module 25 extracts the neo-data from the meta-data and stores the neo-data in a buffer (not shown), and informs the synchronization control unit 40 of the neo-data.

Meanwhile, the analysis module 25 verifies whether or not the extensible media data classified for each track include the neo-data track. If it is verified that the extensible media data include the neo-data track, the analysis module 25 extract the neo-data track from the extensible media. At this time, the analysis module 25 extracts the neo-data included in the extracted neo-data track and header information thereof and transmits the neo-data and the header information thereof to the synchronization control unit 40.

The analysis module 25 configures a neo-data tree on the basis of the header information of the extracted neo-data and stores the neo-data tree in the neo-data buffer (not shown). Herein, in the neo-data tree, the neo-data extracted from the extensible media are arranged in accordance with a temporal sequence.

Therefore, the synchronization control unit 40 can easily grasp synchronization time information of the neo-data through the neo-data tree.

Meanwhile, the analysis module 25 detects the media track from the extensible media data classified for each track. At this time, the analysis module 25 extracts the header information on the media by decoding the detected media track and transmits the extracted header information to the media control unit 50 through the synchronization control unit 40. At this time, when the analysis module 25 receives a request for the media track from the media control unit 50 on the basis of the media header information, the analysis module 25 detects and applies the requested media track to the media control unit 50 through the synchronization control unit 40.

Further, when the analysis module 25 transmits all media tracks, the analysis module 25 transmits a sample for each media track.

The above-configured operation of the present invention will now be described.

Figure 3:
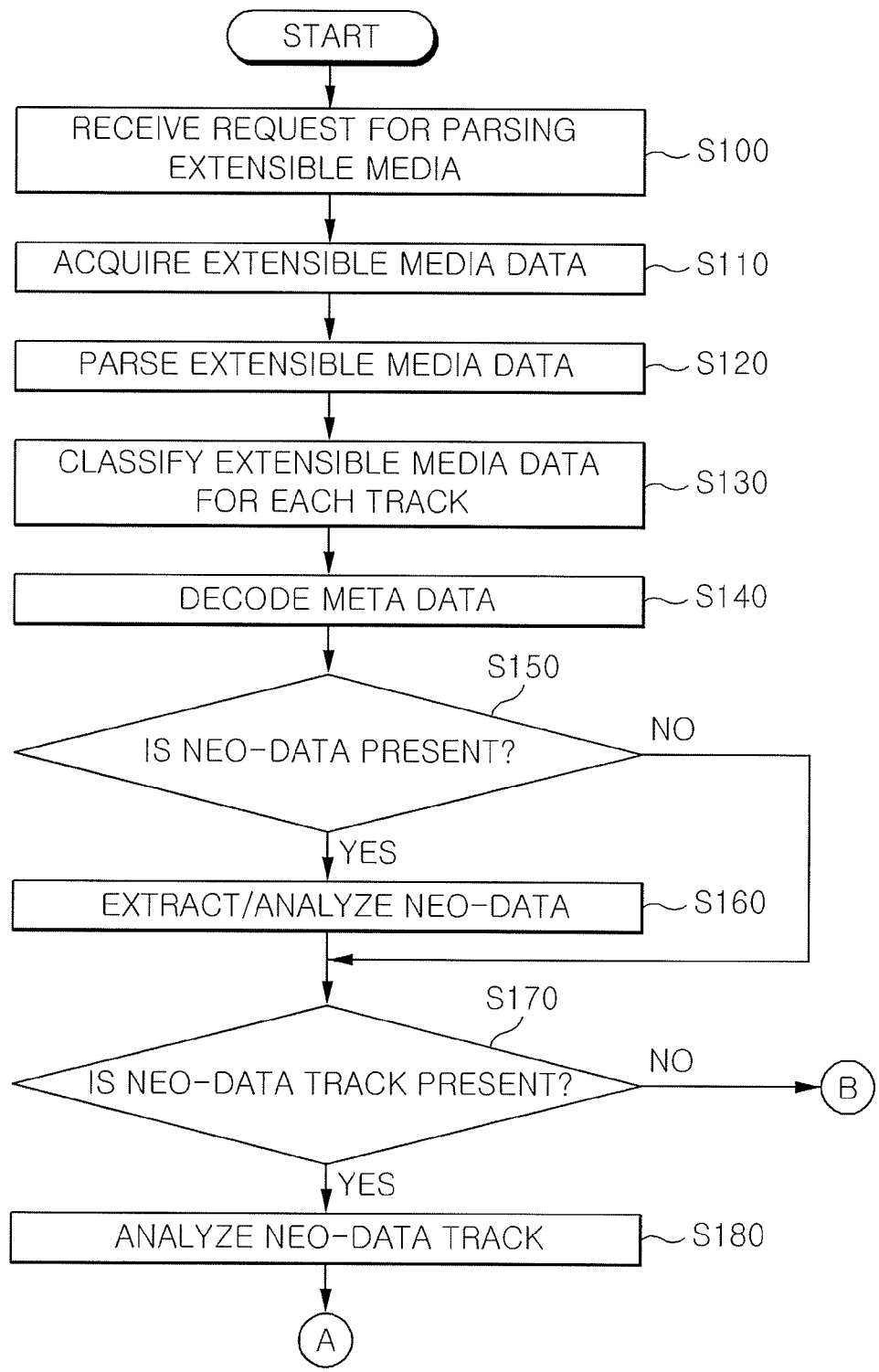
FIGS. 3 to 5 are flowcharts illustrating an operation flow of an extensible media parsing apparatus according to the present invention.
Figure 4:
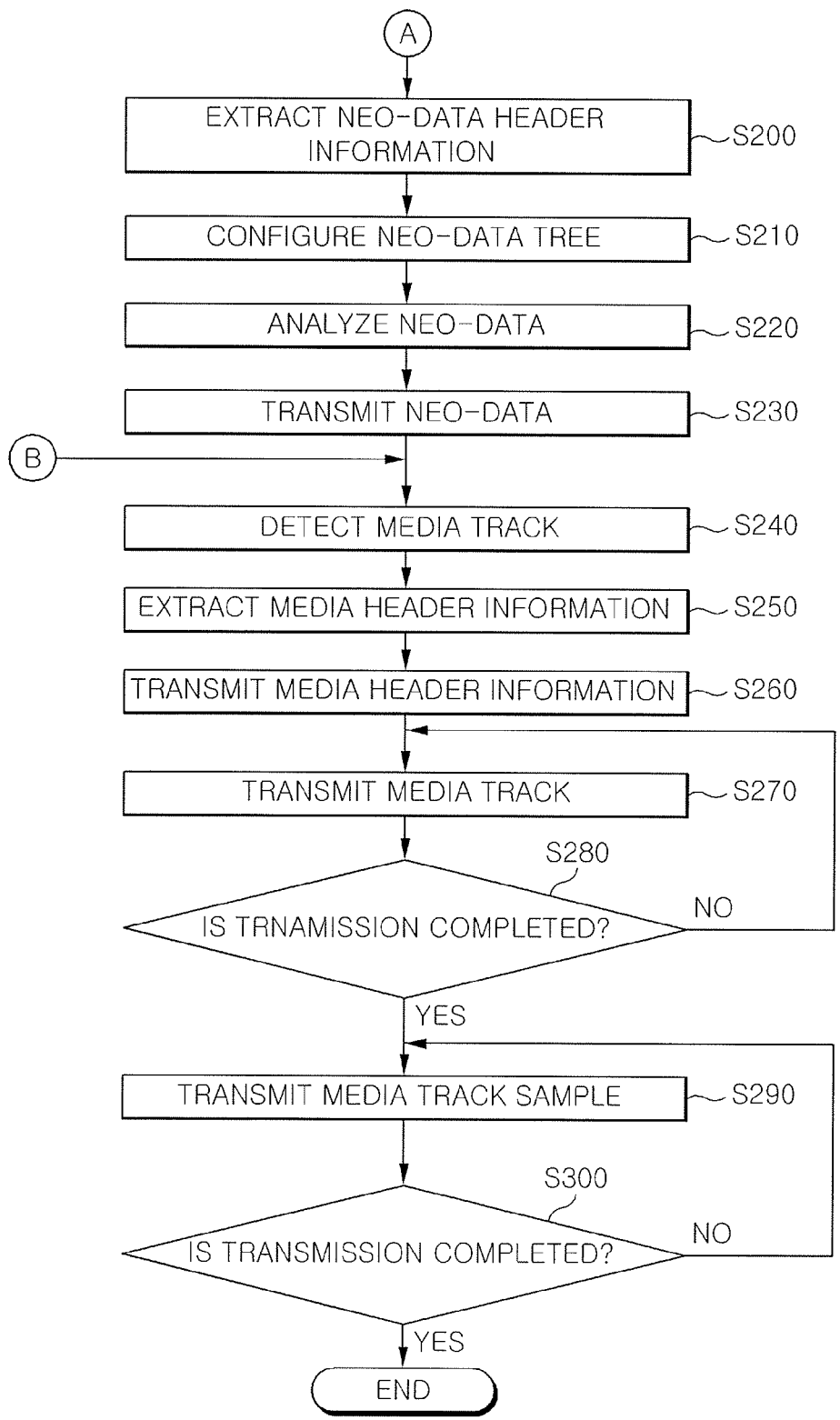

FIGS. 3 and 4 illustrate an operation flow of an extensible media parsing apparatus according to an embodiment of the present invention. FIG. 3 illustrates an operation flow of extracting neo-data from extensible media data and FIG. 4 illustrates an operation flow of transmitting neo-data and a media track.

First, referring to FIG. 3, there is a request for parsing extensible media data from a synchronization control unit 40 (S100), an analyzer 20 acquires and parses the extensible media data that are requested to be parsed (S110 and S120). Herein, a detailed process of acquiring the extensible media data will be described with reference to FIG. 5. The analyzer 20 parses the extensible media data for each object (S120) and classifies each object for each track (S130). At this time, the media track, etc. are classified from the extensible media data and stored in a buffer (not shown).

Further, the analyzer 20 extracts meta data from the extensible media data and decodes the meta data (S140). When it is determined that the meta data includes the neo-data (S150) by checking whether or not the meta data include the neo-data, the analyzer 20 extracts the neo-data from the meta-data and stores the neo-data in the buffer (not shown), and informs the synchronization control unit 40 of it. At this time, a neo-data analysis unit 30 extracts and analyzes the neo-data stored in the buffer in accordance with a control command of the synchronization control unit 40 (S160). Therefore, the synchronization control unit 40 acquires control information of at least one device for implementing the neo-data from the neo-data analysis unit 30.

If the meta data does not include the neo-data (S150), the analyzer 20 instantly performs step 'S170'.

Meanwhile, the analyzer 20 verifies whether or not the extensible media data classified for each track include a neo-data track (S170). If the extensible media data classified for each track do not include the neo-data track, the analyzer 20 proceeds to FIG. 4B and performs follow-up steps. On the contrary, if the extensible media data include the neo-data (S170), the analyzer 20 analyzes the neo-data track to extract the neo-data (S180) and proceeds to FIG. 4A and performs follow-up steps.

Thereafter, as shown in FIG. 4, the analyzer 20 extracts header information on the neo-data from the corresponding neo-data track (S200) and applies the header information to the synchronization control unit 40. Meanwhile, the analyzer 20 configures a neo-data tree on the basis of the neo-data header information and the neo-data track extracted at step 'S200' and the neo-data track (S210) and stores the neo-data tree in the buffer. Herein, in the neo-data tree, the neo-data stored in the buffer are arranged in accordance with a temporal sequence information.

Further, the neo-data analysis unit 30 acquires the control information of at least one device with respect to the neo-data reproduced in link with media by analyzing the neo-data on the basis of the neo-data tree stored in the buffer (S220). At this time, the device control information acquired from the neo-data analysis unit 30 is applied to the synchronization control unit 40.

The synchronization control unit 40 transmits the neo-data stored in the buffer to the device control unit 70 on the basis of the device control information applied from the neo-data analysis unit 30 (S230). At this time, the synchronization control unit 40 determines the device 80 that will reproduce the neo-data from the device control information applied from the neo-data analysis unit 30 and transmits the corresponding device information and synchronization signal to the device control unit 70.

Therefore, the neo-data are reproduced through at least one device 80 connected to the device control unit 70.

Meanwhile, after FIG. 4B, the analyzer 20 detects a media track from the extensible media data classified for each track (S240) and extracts header information on the media from the detected media track (S250). At this time, the extracted header information is transmitted to a media control unit 50 through the synchronization control unit 40 (S260).

If the media track is requested from the media control unit 50 on the basis of the header information of the media, the corresponding media track is detected and applied to the synchronization control unit 40 and the synchronization control unit 40 transmits each media track to the media control unit 50 (S270). Herein, step 'S270' is performed until transmission of all detected media tracks is completed (S280).

Further, a sample for each media track is requested, the analyzer 20 transmits the sample corresponding to each media track to the media control unit 50 through the synchronization control unit 40 (S290). Herein, when transmission of the sample for the media track is completed (S300), parsing the extensible media data is terminated.

Figure 5:
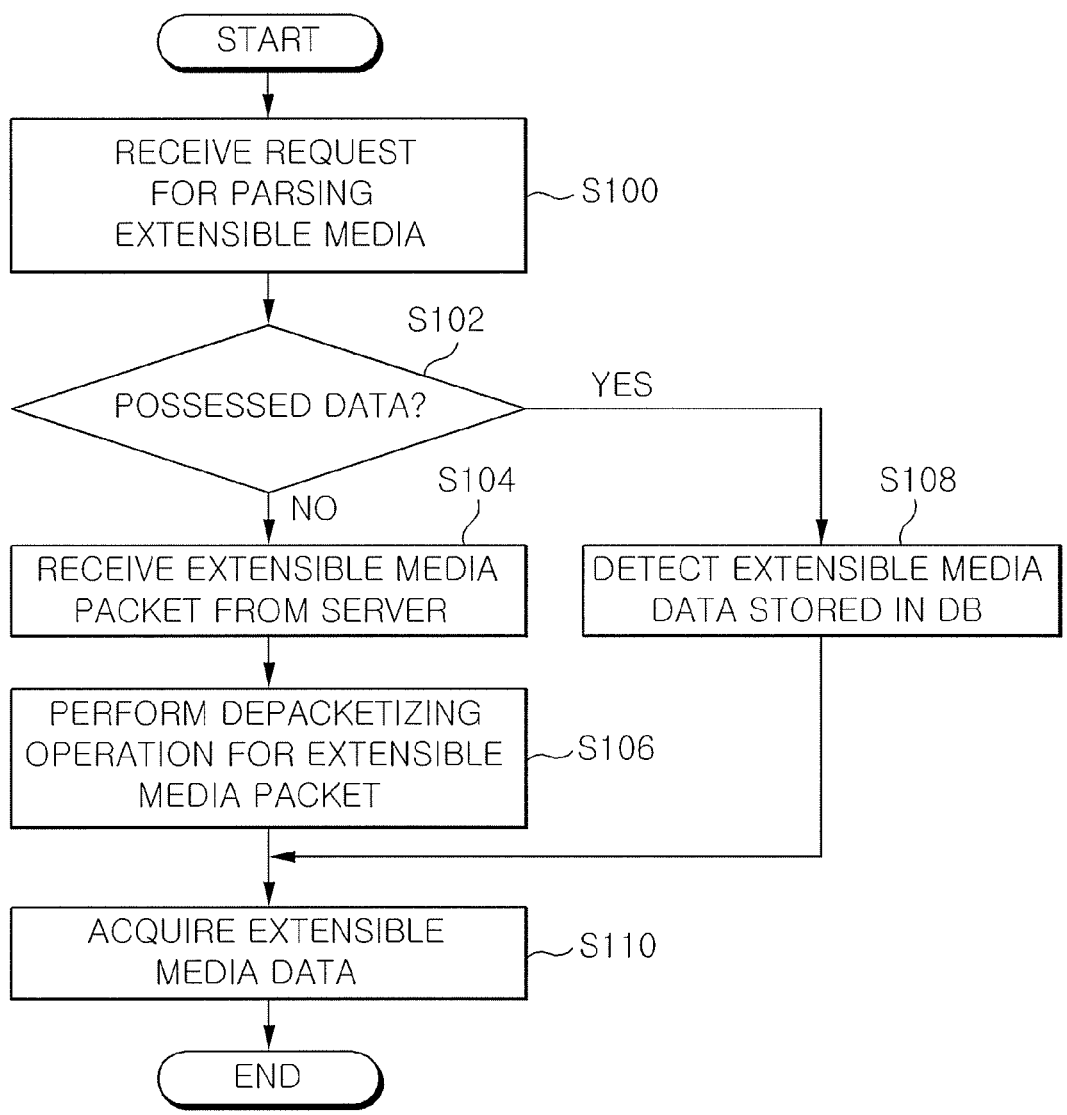

Meanwhile, FIG. 5 illustrates a process of acquiring the extensible media data according to an embodiment of the present invention and illustrates segments of steps 'S100' and 'S110' in FIG. 3. Referring to FIG. 5, there is a request for parsing the extensible media data from the synchronization control unit 40 (S100), the analyzer 20 firstly analyzes information on the parsing-requested extensible media and verifies whether or not the corresponding media are possessed data (S102). If the parsing-requested extensible media are the possessed data, the analyzer 20 detects the parsing-requested extensible media data from the extensible media data stored in the buffer (not shown) (S108) to acquire the extensible media data (S100).

On the contrary, if the parsing-requested extensible media are not the possessed data (S102), the analyzer 20 accesses a server to requests the corresponding extensible media. At this time, when an extensible media pack is received from the server (S104), the analyzer 20 stores the received extensible media packet in the buffer and depacketizes the extensible media packet (S106) to thereby acquire the extensible media data (S100).

As described above, although an apparatus and a method for parsing of extensible media according to the present invention have been described with reference to the accompanying drawings, the present invention is not limited by the embodiments and drawings disclosed in the present invention and may be applied with the scope in which the spirit is protected.

What is claimed is:

1. A method for parsing of extensible media, comprising:
analyzing extensible media and classifying the extensible media for each track in accordance with a request;
determining whether or not meta data of the extensible media include neo-data having additional media and extracting the neo-data from the meta data;
determining whether or not the extensible media include a neo-data track and extracting the neo-data from the neo-data track of the extensible media;
analyzing the extracted neo-data, setting a reproducing sequence of the neo-data on the basis of information on the neo-data, and transmitting the neo-data to a means for controlling the extensible media; and
analyzing the neo-data track, extracting header information and the neo-data information from the neo-data track, and configuring a neo-data tree on the basis of the extracted information.

2. The method for parsing of extensible media according to claim 1, wherein the extensible media include at least one of media, the neo-data, synchronization information on at least one device for reproducing the neo-data, and identification information on the device.

3. The method for parsing of extensible media according to claim 2, further comprising: extracting the synchronization information on at least one device and identification information on at least one device from the extensible media and transmitting them to the means for controlling the extensible media.

4. The method for parsing of extensible media according to claim 1, wherein the neo-data include software for reproducing of the neo-data included in the extensible media and controlling of the device, which corresponds thereto.

5. The method for parsing of extensible media according to claim 1, wherein in the neo-data tree, the extracted neo-data are arranged in accordance with a temporal sequence.

6. The method for parsing of extensible media according to claim 1, further comprising: analyzing a media track from the extensible media and extracting the header information from the media track.

7. The method for parsing of extensible media according to claim 6, wherein, at the time of setting a reproducing sequence of the neo-data, the reproducing sequence of the neo-data corresponding to the playing time of the media is set based on the header information extracted from the media track.

8. The method for parsing of extensible media according to claim 1, further comprising: verifying whether or not the parsing-requested extensible media are possessed media and detecting the parsing-requested extensible media from a buffer when the parsing-requested extensible media are the possessed media.

9. The method for parsing of extensible media according to claim 1, further comprising: verifying whether or not the parsing-requested extensible media is the possessed media and downloading the extensible media by accessing to a server when the parsing-requested extensible media are not the possessed media.

10. The method for parsing of extensible media according to claim 9, further comprising: depacketizing a packet of the extensible media downloaded from the server and converting the extensible media into data having a predetermined format.

11. An apparatus for parsing of extensible media, comprising:
an analyzer that analyzes the extensible media and extracts neo-data and header information of the neo-data from at least one of meta data and a neo-data track of the extensible media, wherein the analyzer configures a neo-data tree on the basis of the extracted neo-data and the header information of the neo-data;
a neo-data analysis unit that analyzes the neo-data extracted through the analyzer and detects predetermined device control information for reproducing the neo-data; and
a synchronization control unit that controls a reproducing sequence of the neo-data on the basis of the device control information provided from the neo-data analysis unit.

12. The apparatus for parsing of extensible media according to claim 11, wherein the analyzer includes:
a reception module that receives extensible media downloaded from a server;
a conversion module that depacketizes a packet of the extensible media acquired through the reception module and converts the extensible media into data having a predetermined format; and
an analysis module that analyzes the extensible media converted through the conversion module and transmits the neo-data extracted from the extensible media to the synchronization control unit.

13. The apparatus for parsing extensible media according to claim 11, wherein in the neo-data tree, the extracted neo-data are arranged in accordance with a temporal sequence.

* * * * *